United States Patent
Ochi

(10) Patent No.: US 11,608,902 B2
(45) Date of Patent: Mar. 21, 2023

(54) GATE VALVE

(71) Applicant: SMC CORPORATION, Tokyo (JP)

(72) Inventor: Tsuyoshi Ochi, Tsukubamirai (JP)

(73) Assignee: SMC CORPORATION, Tokyo (JP)

(*) Notice: Subject to any disclaimer, the term of this patent is extended or adjusted under 35 U.S.C. 154(b) by 0 days.

(21) Appl. No.: 17/657,406

(22) Filed: Mar. 31, 2022

(65) Prior Publication Data

US 2022/0333695 A1    Oct. 20, 2022

(30) Foreign Application Priority Data

Apr. 20, 2021  (JP) .............................. JP2021-070864

(51) Int. Cl.
| | | |
|---|---|---|
| *F16K 3/314* | (2006.01) | |
| *F16K 1/48* | (2006.01) | |
| *F16K 3/02* | (2006.01) | |
| *F16K 51/02* | (2006.01) | |
| *F16K 3/18* | (2006.01) | |

(52) U.S. Cl.
CPC .............. *F16K 3/314* (2013.01); *F16K 1/487* (2013.01); *F16K 3/0281* (2013.01); *F16K 3/18* (2013.01); *F16K 51/02* (2013.01)

(58) Field of Classification Search
CPC ........ F16K 3/314; F16K 1/487; F16K 3/0281; F16K 3/18; F16K 51/02
USPC ................................................. 251/326–329
See application file for complete search history.

(56) References Cited

U.S. PATENT DOCUMENTS

| | | | | |
|---|---|---|---|---|
| 1,645,785 | A * | 10/1927 | Gemmel | F16K 3/12 |
| | | | | 29/890.124 |
| 2,870,987 | A * | 1/1959 | Greenwood | F16K 3/12 |
| | | | | 251/327 |
| 3,000,610 | A * | 9/1961 | Bryant | F16K 3/0227 |
| | | | | 251/327 |
| 5,013,009 | A * | 5/1991 | Nelson | F16K 3/12 |
| | | | | 251/328 |
| 8,511,642 | B2 * | 8/2013 | Schoch | F16K 3/188 |
| | | | | 251/327 |
| 8,534,311 | B2 * | 9/2013 | Ishigaki | F16K 3/3165 |
| | | | | 137/341 |

(Continued)

FOREIGN PATENT DOCUMENTS

JP     2012-225468 A     11/2012

OTHER PUBLICATIONS

European Search Report dated Sep. 20, 2022 in European Patent Application No. 22167536.6.

*Primary Examiner* — John Bastianelli

(74) *Attorney, Agent, or Firm* — Oblon, McClelland, Maier & Neustadt, L.L.P.

(57) ABSTRACT

A connecting fitting is disposed on an upper face of a valve plate and is fixed to the connecting shaft. A first close-contact mechanism portion is formed at a portion where the connecting fitting and the connecting shaft are in contact with each other, a second close-contact mechanism portion is formed at a portion where the connecting fitting and the valve plate are in contact with each other, and a third close-contact mechanism portion is formed at a portion where the lower end of the valve plate and the lower end of the connecting shaft are in contact with each other. By bringing the valve plate and the connecting shaft toward each other with the close-contact mechanism portions of three vertical positions, a hole front face of a connection hole and a shaft front face of a connecting shaft are brought into close contact with each other.

7 Claims, 19 Drawing Sheets

(56) References Cited

U.S. PATENT DOCUMENTS

| | | | |
|---|---|---|---|
| 8,657,257 B2* | 2/2014 | Shimoda | F16K 3/18 |
| | | | 251/300 |
| 2011/0095218 A1 | 4/2011 | Schoch et al. | |
| 2019/0211936 A1* | 7/2019 | Shimoda | F16K 3/30 |
| 2020/0400238 A1* | 12/2020 | Shimoda | F16K 3/184 |

* cited by examiner

GATE VALVE

DESCRIPTION

Technical Field

The present invention relates to a gate valve and, more specifically, to a gate valve with improved degree of close contact at a connecting portion between a valve plate and a valve rod.

Background Art

In a semiconductor processing device, a gate valve is used for opening and closing a gate formed in a vacuum chamber. The gate valve is configured such that a valve plate attached to an end of a valve rod is accommodated in a valve body, the valve body is attached to the vacuum chamber, and an opening provided in the valve body so as to communicate with the gate is opened and closed with the valve plate. At that time, closing of the opening is performed by pressing a seal member attached to the valve plate against a valve seat around the opening.

In the gate valve, because the seal member gradually deteriorates due to wearing, cracking, and other reasons with use, it needs to be replaced with a new seal member when deteriorated. In that case, because the conventional gate valve needs to be temporarily removed from the vacuum chamber, a great deal of effort and time have been required for the replacement of the seal member.

Furthermore, because the line width of semiconductor devices has become even smaller these days, reducing particles produced in the processing process thereof is required (the goal is zero particle). Therefore, how to eliminate the occurrence of rubbing between components during the operation of the gate valve is an important issue. In particular, when the valve plate and the valve rod are not sufficiently in close contact with each other at the connecting portion therebetween, rubbing tends to occur therebetween. Hence, it is important to increase the degree of close contact between the valve plate and the valve rod.

In contrast, PTL 1 discloses a gate valve with increased degree of close contact at the connecting portion between the valve plate and the valve rod. In this improved gate valve, inclined surfaces that come into contact with each other are formed on a connecting plate attached to an upper face of the valve plate and on a valve-plate attaching portion of the valve rod to be fitted into an attaching hole in the valve plate, inclined surfaces that come into contact with each other are also formed on the lower end of the valve plate and on the lower end of the valve-plate attaching portion, and, by bringing these inclined surfaces into contact with each other with pressure, the valve plate and the valve-plate attaching portion are brought into close contact with each other by a wedge effect.

This improved gate valve has higher degree of close contact between the valve plate and the valve-plate attaching portion than a typical gate valve. However, because the opposing surfaces of the valve plate and the valve-plate attaching portion are pressed against each other at two positions by forming the inclined surfaces for realizing the wedge effect at two positions of the valve-plate attaching portion in the diagonal direction, it has sometimes been difficult to bring these opposing surfaces into close contact with each other evenly over the entire surfaces, and thus, there is still a room for improvement. In particular, in a type of gate valve in which a heater is provided in the valve rod, and the valve plate is heated with the heater, good heat transfer between the valve rod and the valve plate needs to be maintained. Thus, it is important to increase the degree of close contact between the valve rod and the valve plate as much as possible.

CITATION LIST

Patent Literature

PTL 1: Japanese Unexamined Patent Application Publication No. 2012-225468

SUMMARY OF INVENTION

Technical Problem

The technical problem of the present invention is to provide a gate valve with higher degree of close contact at the connecting portion between the valve plate and the valve rod.

Solution to Problem

To solve the above-described problem, a gate valve according to the present invention includes: a valve plate for opening and closing an opening in a valve body; and a valve rod connected to the valve plate. The valve plate includes a valve front face facing the opening, a valve back face on the opposite side to the valve front face, a valve upper face, a valve lower face, and a connection hole vertically penetrating through the valve plate. The valve rod includes a connecting shaft inserted through the connection hole. The connection hole includes a hole front face and a hole back face, and the connecting shaft includes a shaft front face and a shaft back face. The hole front face and the shaft front face face each other, and the hole back face and the shaft back face face each other. A connecting fitting for connecting the valve plate and the valve rod is provided on the upper face of the valve plate. The connecting fitting is disposed so as to be in contact with a part of the connecting shaft and a part of the valve plate by screwing a connecting screw into a screw hole at an end of the connecting shaft through a screw insertion hole in the connecting fitting.

A first close-contact mechanism portion where a first inclined surface of the connecting fitting and a second inclined surface of the connecting shaft are in contact with each other is formed at a portion where the connecting fitting is in contact with the connecting shaft, and a second close-contact mechanism portion where a third inclined surface of the connecting fitting and a fourth inclined surface of the valve plate are in contact with each other is formed at a portion where the connecting fitting is in contact with the valve plate. When the first inclined surface is pressed against the second inclined surface, and the third inclined surface is pressed against the fourth inclined surface by fastening the connecting screw, the first close-contact mechanism portion and the second close-contact mechanism portion generate, at the upper end of the connecting shaft and the upper end of the valve plate, components of force in directions in which the shaft front face of the connecting shaft and the hole front face of the connection hole are brought into close contact with each other.

Furthermore, a third close-contact mechanism portion where a fifth inclined surface of the valve plate and a sixth inclined surface of the connecting shaft are in contact with each other is formed at a portion where the lower end of the valve plate is in contact with a projecting wall portion at the lower end of the shaft front face of the connecting shaft. When the fifth inclined surface is pressed against the sixth inclined surface by fastening the connecting screw, the third close-contact mechanism portion generates, at the lower end of the valve plate, a component of force in a direction in which the hole front face of the valve hole is brought into close contact with the shaft front face of the connecting shaft.

In the present invention, the first close-contact mechanism portion and the second close-contact mechanism portion are located at positions on the opposite sides to each other with respect to a center axis passing through the center of the screw hole. The inclination direction of the first inclined surface and the second inclined surface and the inclination direction of the third inclined surface and the fourth inclined surface are opposite to each other and become closer to the center axis at upper portions thereof.

The inclination angle of the first inclined surface and the second inclined surface with respect to the center axis is smaller than the inclination angle of the third inclined surface and the fourth inclined surface with respect to the center axis.

In the present invention, the connecting fitting is not in contact with the valve plate or the valve rod at portions other than the first close-contact mechanism portion and the second close-contact mechanism portion.

Furthermore, the connecting fitting is accommodated in a recess formed in the upper face of the valve plate so as not to project upward from the upper face of the valve plate.

In the present invention, the fourth inclined surface and the fifth inclined surface may be formed on a first auxiliary fitting and a second auxiliary fitting that are securely attached to the valve plate, and the second inclined surface may be formed on a shaft auxiliary fitting that is fixed to the connecting shaft of the valve rod.

Furthermore, in the present invention, a heater hole may be formed inside the valve rod so as to extend to the inside of the connecting shaft, and a heater may be accommodated in the heater hole.

Advantageous Effects of Invention

According to the present invention, because the hole front face of the connection hole in the valve plate and the shaft front face of the connecting shaft of the valve rod are pressed against each other at three vertical positions of the valve plate and the connecting shaft with the first to third close-contact mechanism portions at which the inclined surfaces are in contact with one another, it is possible to reliably bring the hole front face of the connection hole and the shaft front face of the connecting shaft into close contact with each other over the entire facing surfaces thereof.

DESCRIPTION OF EMBODIMENTS

Figure 1:
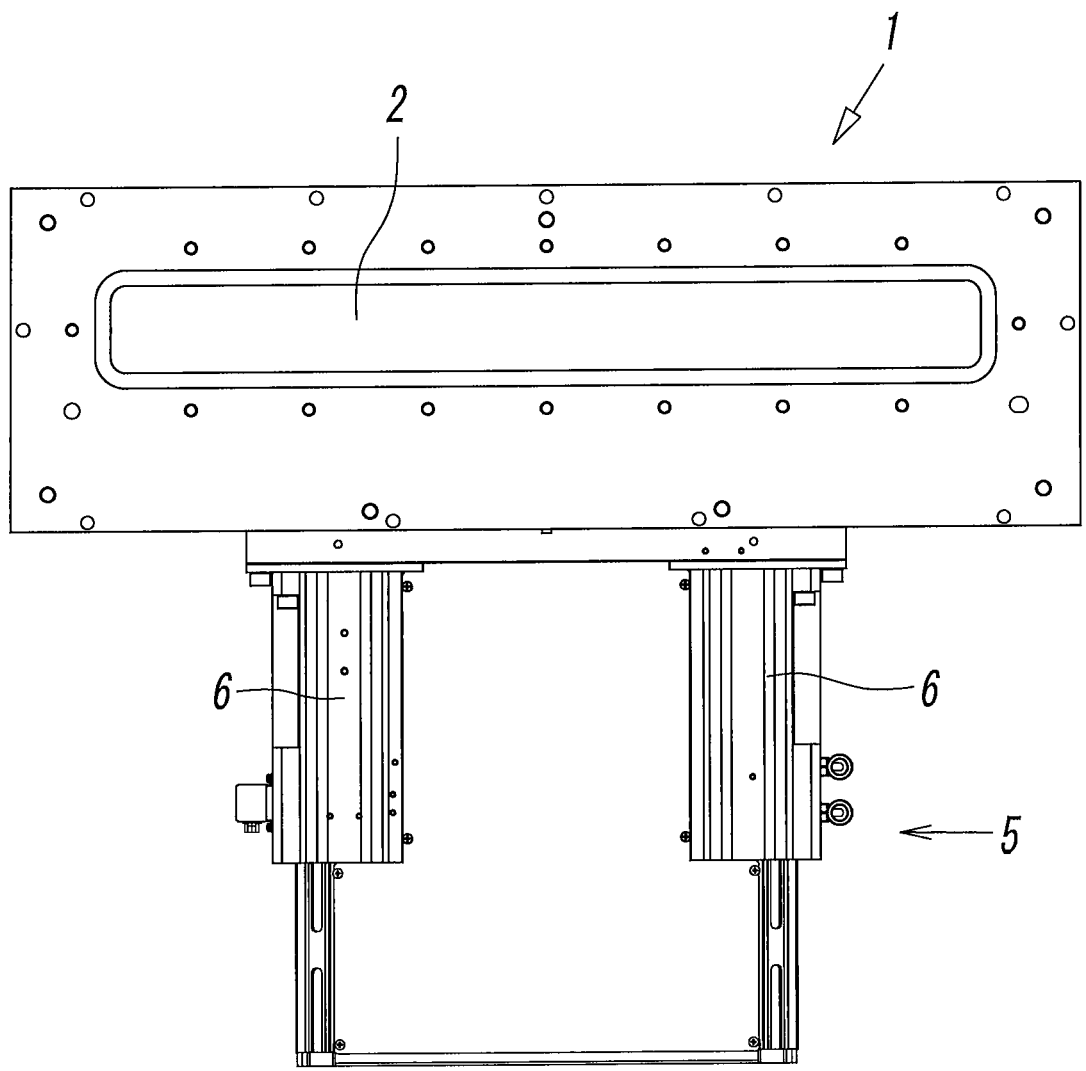
FIG. 1 is a front view of a gate valve according to the present invention.
Figure 2:
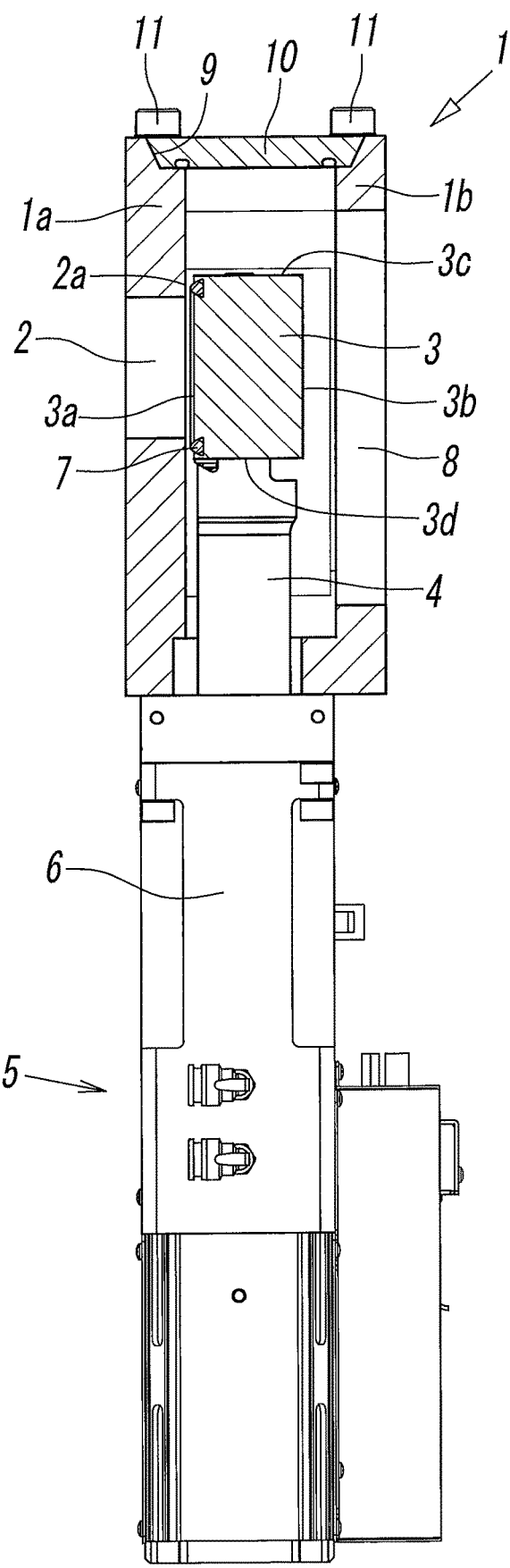
FIG. 2 is an enlarged sectional view of the relevant part in FIG. 1.

FIGS. 1 and 2 show a gate valve according to the present invention. This gate valve is attached to a vacuum chamber (not shown) when used, and includes: a valve body 1 having an opening 2 communicating with a gate of the vacuum chamber; a valve plate 3 that is accommodated in the valve body 1 and opens and closes the opening 2; a valve rod 4 connected to the valve plate 3; and an operating part 5 that performs opening/closing operation of the valve plate 3 via the valve rod 4. The operating part 5 displaces the valve plate 3 between an open position where the opening 2 is fully open and a closed position where the opening 2 is closed.

The operating part 5 has two air cylinders 6, 6 that are arranged parallel to each other on the left and right sides of the valve rod 4. The air cylinders 6, 6 open and close the valve plate 3 via the valve rod 4. However, because such configuration and operation of the operating part 5 are known, the explanation thereof will be omitted here.

The valve body 1 has the shape of a rectangular box elongated in the left-right direction and has a front wall 1a and a rear wall 1b. The front wall 1a to be connected to the vacuum chamber has the opening 2, which has a horizontally elongated rectangular shape, and a planar valve seat 2a surrounding the opening 2. The opening 2 is configured to be closed when a seal member 7 attached to the valve front face 3a of the valve plate 3 is pressed against the valve seat 2a.

The rear wall 1b of the valve body 1 also has a rear opening 8, which is larger than the opening 2, but the rear opening 8 is not opened and closed by the valve plate 3.

In the description below, the front-rear direction, the top-bottom direction, and the left-right direction of the valve body 1 and the front-rear direction, the top-bottom direction, and the left-right direction of the other components are the same directions.

A window hole 9 is formed in the upper face of the valve body 1, and a cover 10 is removably attached to the window hole 9 with multiple cover attaching screws 11. The valve plate 3 may be detached from the valve rod 4 and taken out through the window hole 9, which has been opened by removing the cover 10. However, attachment/detachment of the valve plate 3 may be performed through the rear opening 8 without providing the window hole 9 and the cover 10 in the upper face of the valve body 1.

Figure 3:
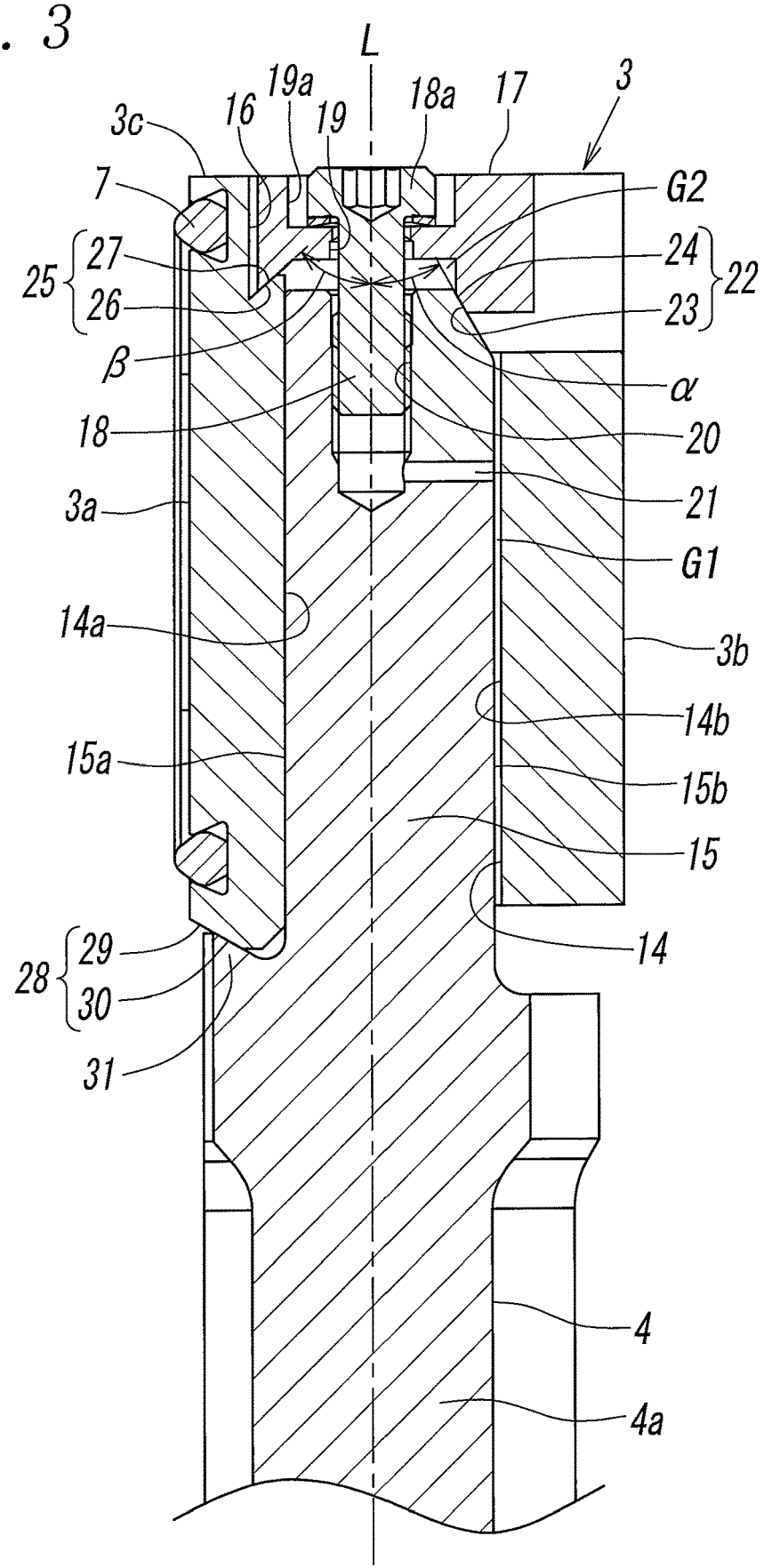
FIG. 3 is a sectional view showing the basic connecting structure between a valve plate and a valve rod.
Figure 4:
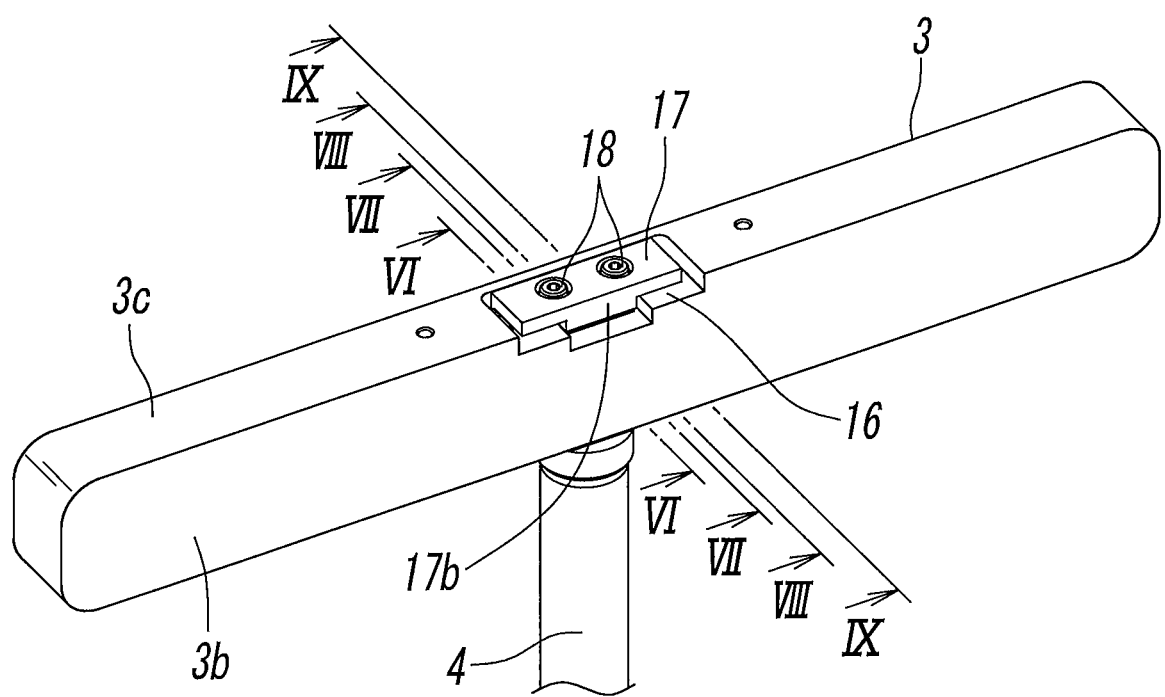
FIG. 4 is a perspective view of a first connecting structure for connecting the valve plate and the valve rod.

As can be seen from FIGS. 2 and 4, the valve plate 3 has a horizontally elongated rectangular plate shape and includes: a valve front face 3a, to which the seal member 7 is attached; a valve back face 3b on the opposite side to the valve front face 3a; a valve upper face 3c; and a valve lower face 3d. The valve front face 3a and the valve back face 3b are planes parallel to each other. The valve plate 3 is connected to the upper end of the valve rod 4 such that it can be removed from the upper part of the valve plate 3. Now, the connection between the valve plate 3 and the valve rod 4 will be described below. Before a first connecting structure shown in FIGS. 4 to 18 will be described, the principle of the connection between the valve plate 3 and the valve rod 4 will be described on the basis of the basic structure shown in FIG. 3.

As shown in FIG. 3, the valve plate 3 has a connection hole 14 vertically penetrating through the valve plate 3, and the valve rod 4 has, at an end of a cylindrical rod body 4a, a connecting shaft 15 fitted into the connection hole 14.

Figure 5:
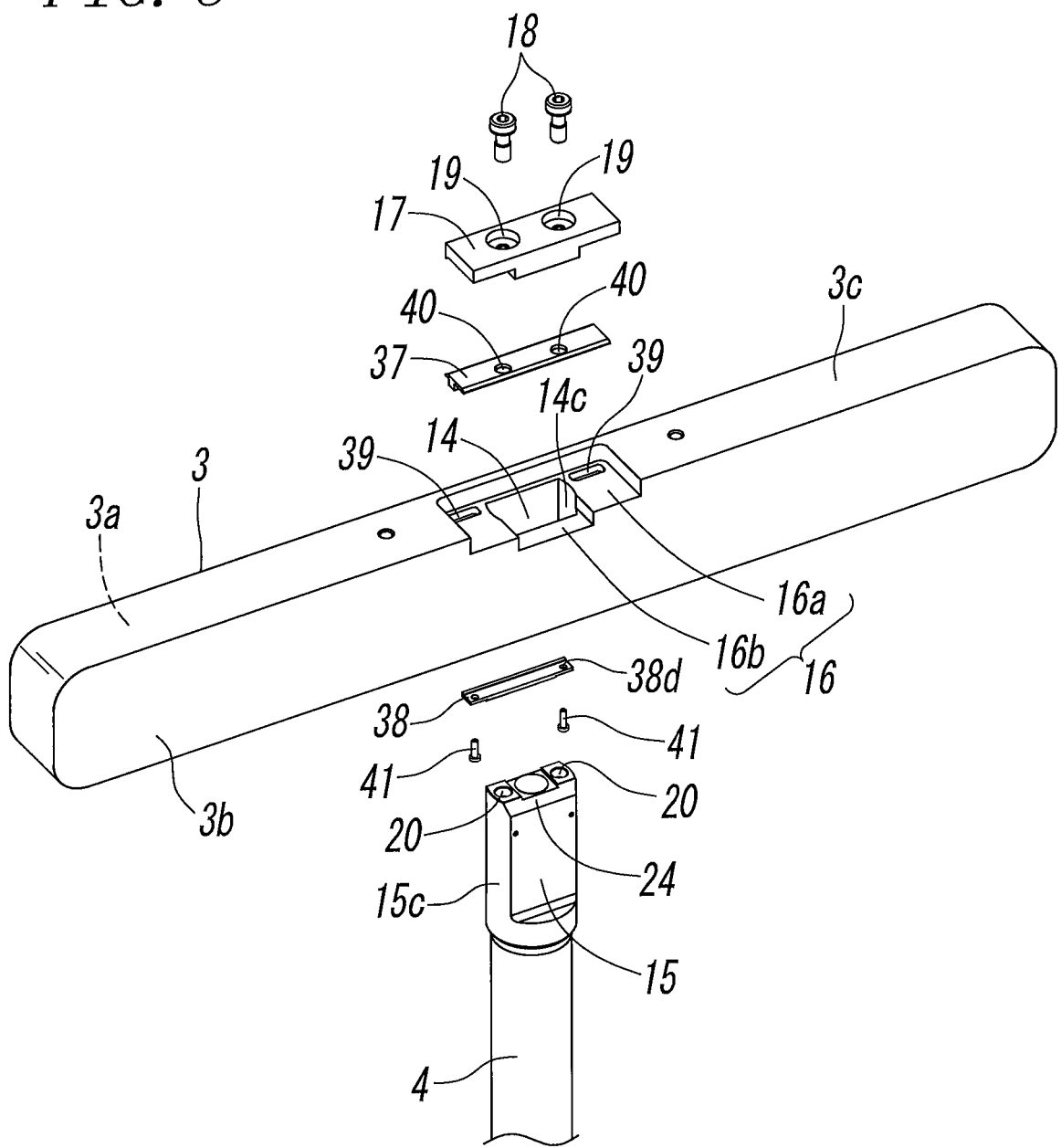
FIG. 5 is an exploded view of FIG. 4.
Figure 6:
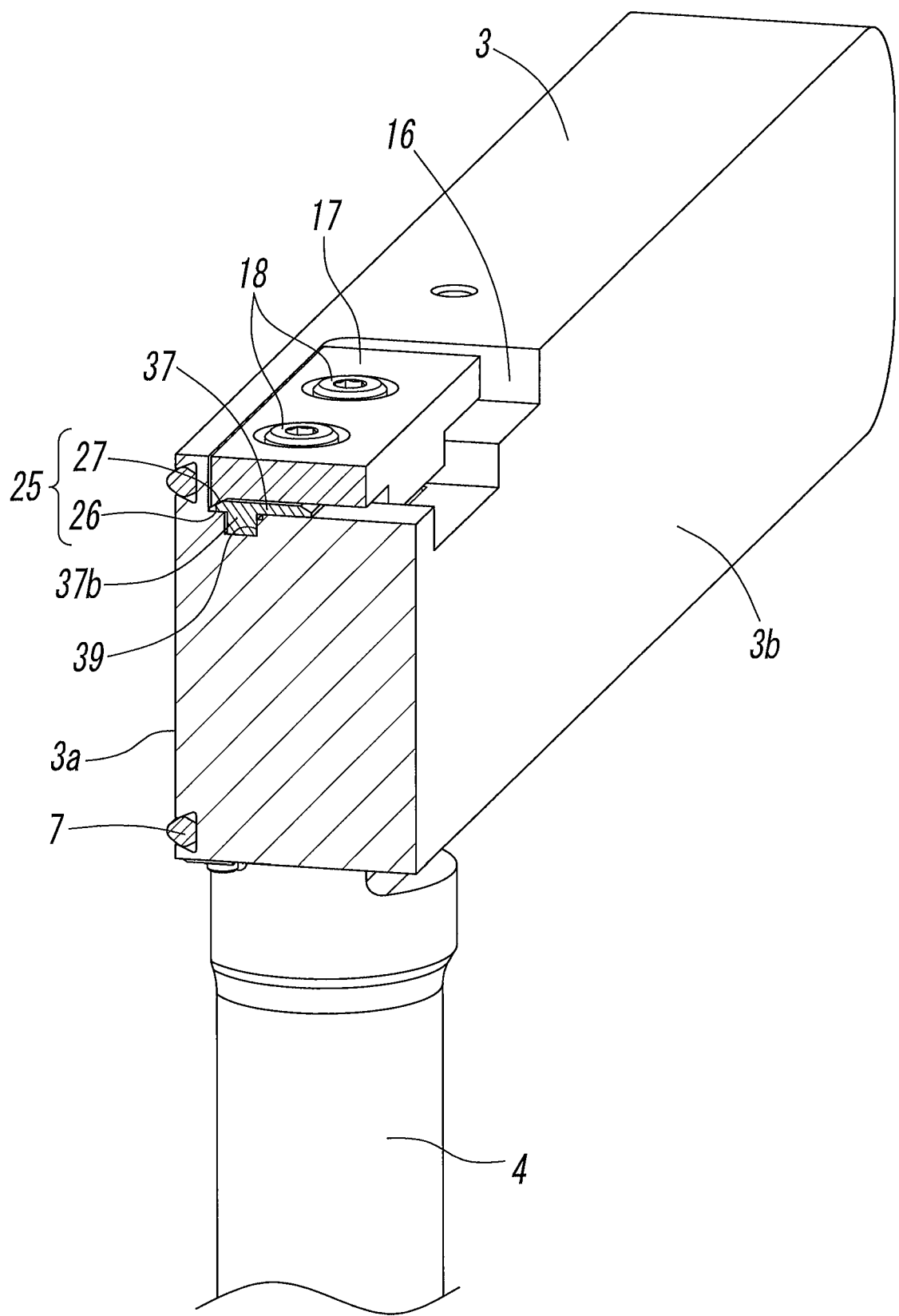
FIG. 6 is a sectional view taken along line VI-VI in FIG. 4.
Figure 7:
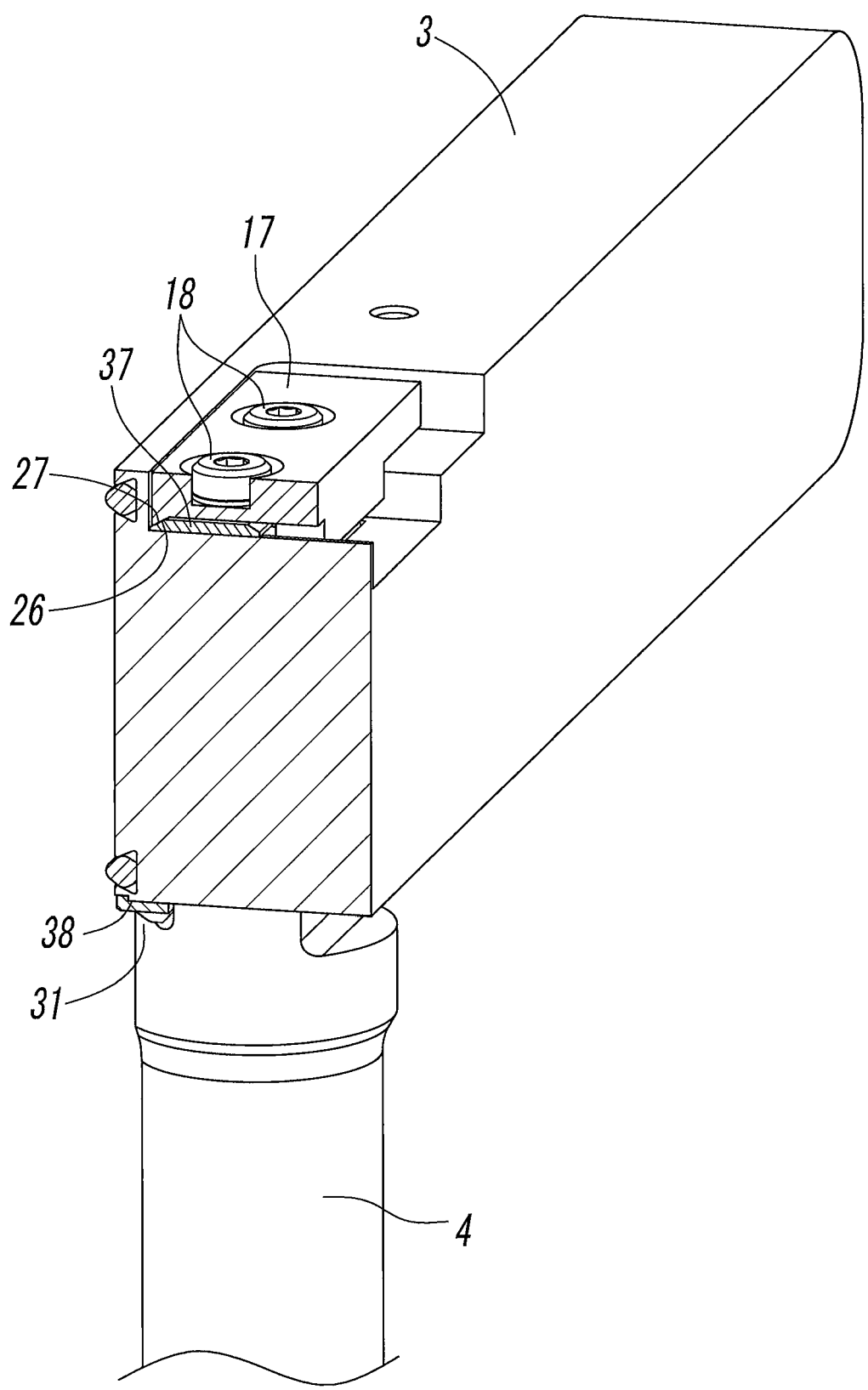
FIG. 7 is a sectional view taken along line VII-VII in FIG. 4.

The connection hole 14 has a narrow, long elongated-hole-shaped cross-section extending in the longitudinal direction (left-right direction) of the valve plate 3 and has a hole front face 14a located on the valve front face 3a side, a hole back face 14b located on the valve back face 3b side, and left and right hole side surfaces 14c, 14c (see FIG. 5). The hole front face 14a and the hole back face 14b are planes parallel to each other, and the hole side surfaces 14c, 14c are arch-shaped concave surfaces.

On the other hand, the connecting shaft 15 has such a shape that the front face and the back face of the column are cut away along two parallel planes, and has a shaft front face 15a facing the hole front face 14a of the connection hole 14, a shaft back face 15b facing the hole back face 14b of the connection hole 14, and left and right shaft side surfaces 15c, 15c (see FIG. 5) facing the left and right hole side surfaces 14c, 14c of the connection hole 14. The shaft front face 15a and the shaft back face 15b are planes parallel to each other, and the left and right shaft side surfaces 15c, 15c are arch-shaped convex surfaces.

A connecting fitting 17 for connecting the valve plate 3 and the valve rod 4 is provided on the upper faces of the valve plate 3 and the connecting shaft 15. This connecting fitting 17 is provided in a recess 16 formed in the upper face of the valve plate 3 so as to straddle a facing portion between the hole front face 14a of the valve plate 3 and the shaft front face 15a of the connecting shaft 15 and is fixed to the connecting shaft 15 by screwing connecting screws 18 into screw holes 20 formed in the upper end of the connecting shaft 15 through screw insertion holes 19 formed in the connecting fitting 17. At this time, the front end and the rear end of the connecting fitting 17 are in contact with portions of the valve plate 3 and the connecting shaft 15.

The connecting fitting 17 is formed of a metal material that is unlikely to be deformed when screwed by the connecting screws 18 and is provided in the recess 16 so as not to project upward from the recess 16.

Because the inside diameter of the screw insertion holes 19 is such a size that the connecting screws 18 are loosely inserted thereinto, the connecting fitting 17 can slightly displace in a direction perpendicular to the connecting screws 18 when the connecting screws 18 are fastened. Furthermore, hollow portions 19a are formed at the upper ends of the screw insertion holes 19, and heads 18a of the connecting screws 18 are accommodated in the hollow portions 19a so as not to significantly project upward from the connecting fitting 17.

Note that the portion denoted by reference sign 21 in figures is an exhaust hole, through which the air in the screw holes 20 is released to a gap G1 between the hole back face 14b and the shaft back face 15b when the connecting screws 18 are screwed into the screw holes 20.

A first inclined surface 23 is formed at a portion where the rear end of the connecting fitting 17 is in contact with the connecting shaft 15. The first inclined surface 23 makes contact with a second inclined surface 24 formed at the upper end of the shaft back face 15b of the connecting shaft 15. The first inclined surface 23 and the second inclined surface 24 form a first close-contact mechanism portion 22.

Furthermore, a third inclined surface 26 is formed at a portion where the front end of the connecting fitting 17 is in contact with the valve plate 3. The third inclined surface 26 makes contact with a fourth inclined surface 27 formed at a position closer to the valve front face 3a than the hole front face 14a of the upper end of the valve plate 3. The third inclined surface 26 and the fourth inclined surface 27 form a second close-contact mechanism portion 25.

Furthermore, a fifth inclined surface 29 is formed at the lower end of the valve front face 3a of the valve plate 3. The fifth inclined surface 29 makes contact with a sixth inclined surface 30 of a projecting wall portion 31 formed at the lower end of the shaft front face 15a of the connecting shaft 15. The fifth inclined surface 29 and the sixth inclined surface 30 form a third close-contact mechanism portion 28.

The first inclined surface 23 and the second inclined surface 24 of the first close-contact mechanism portion 22 are inclined such that the upper portions thereof are closer to the center axis L passing through the center of the screw holes 20. The third inclined surface 26 and the fourth inclined surface 27 of the second close-contact mechanism portion 25 are also inclined such that the upper portions thereof are closer to the center axis L. In this case, because the first close-contact mechanism portion 22 and the second close-contact mechanism portion 25 are located on the opposite sides to each other with respect to the center axis L, the inclination direction of the first inclined surface 23 and the second inclined surface 24 and the inclination direction of the third inclined surface 26 and the fourth inclined surface 27 are opposite to each other.

On the other hand, the fifth inclined surface 29 and the sixth inclined surface 30 of the third close-contact mechanism portion 28 are inclined such that the upper portions thereof are farther from the center axis L, and the inclination direction thereof is opposite to the inclination direction of the third inclined surface 26 and the fourth inclined surface 27 of the second close-contact mechanism portion 25.

Furthermore, the inclination angle $\alpha$ of the first inclined surface 23 and the second inclined surface 24 with respect to the center axis L is smaller than the inclination angle $\beta$ of the third inclined surface 26 and the fourth inclined surface 27 with respect to the center axis L. However, they may be the same angle, or the inclination angle $\alpha$ may be larger than the inclination angle $\beta$.

Furthermore, although the second close-contact mechanism portion 25 is located at a position closer to the upper face of the valve plate 3 than the first close-contact mechanism portion 22 is, they may be located at the same vertical position.

As described, the first close-contact mechanism portion 22 and the second close-contact mechanism portion 25 are formed at the portions where the connecting fitting 17 is in contact with each of the upper end of the valve plate 3 and the upper end of the connecting shaft 15, and the third close-contact mechanism portion 28 is formed at the portion where the lower end of the valve plate 3 is in contact with the lower end of the connecting shaft 15. Hence, when the connecting screws 18 are fastened, the first inclined surface 23 is strongly pressed against the second inclined surface 24 at the first close-contact mechanism portion 22, and a component of force in a direction in which the shaft front face 15a is pressed against the hole front face 14a acts on the connecting shaft 15 through the second inclined surface 24. Furthermore, at the second close-contact mechanism portion 25, the third inclined surface 26 is strongly pressed against the fourth inclined surface 27, and a component of force in a direction in which the hole front face 14a is pressed against the shaft front face 15a acts on the valve plate 3 through the fourth inclined surface 27. As a result, the valve plate 3 and the connecting shaft 15 are drawn to each other by the connecting fitting 17 in the directions in which the shaft front face 15a and the hole front face 14a are brought into close contact.

On the other hand, on the lower-end side of the valve plate 3, at the third close-contact mechanism portion 28, the valve plate 3 is pushed downward by the connecting fitting 17, and the lower end of the valve plate 3 is pressed against the projecting wall portion 31. As a result, the fifth inclined surface 29 is strongly pressed against the sixth inclined surface 30, and a component of force in a direction in which the hole front face 14a is pressed against the shaft front face 15a acts on the lower part of the valve plate 3 through the fifth inclined surface 29. This component of force causes the lower portion of the hole front face 14a to be brought into close contact with the lower portion of the shaft front face 15a.

As a result, the hole front face 14a of the connection hole 14 in the valve plate 3 and the shaft front face 15a of the connecting shaft 15 are evenly brought into close contact with each other over the entire facing surfaces.

On the other hand, the hole back face 14b of the connection hole 14 and the shaft back face 15b of the connecting shaft 15 come out of contact with each other, and the gap G1 is formed therebetween.

At this time, the connecting fitting 17 is not in contact with the valve plate 3 and the valve rod 4 except for the rear end thereof being in contact with the connecting shaft 15 at the first close-contact mechanism portion 22 and the front end thereof being in contact with the valve plate 3 at the second close-contact mechanism portion 25 and is fixed to the connecting shaft 15 while maintaining a gap G2 between itself and the upper face of the connecting shaft 15.

Note that there may be one connecting screw 18 and one screw hole 20 on the center axis L, or may be two connecting screws 18 and two screw holes 20, which are provided at positions opposed to each other with the center axis L therebetween, as shown in FIG. 4.

Figure 8:
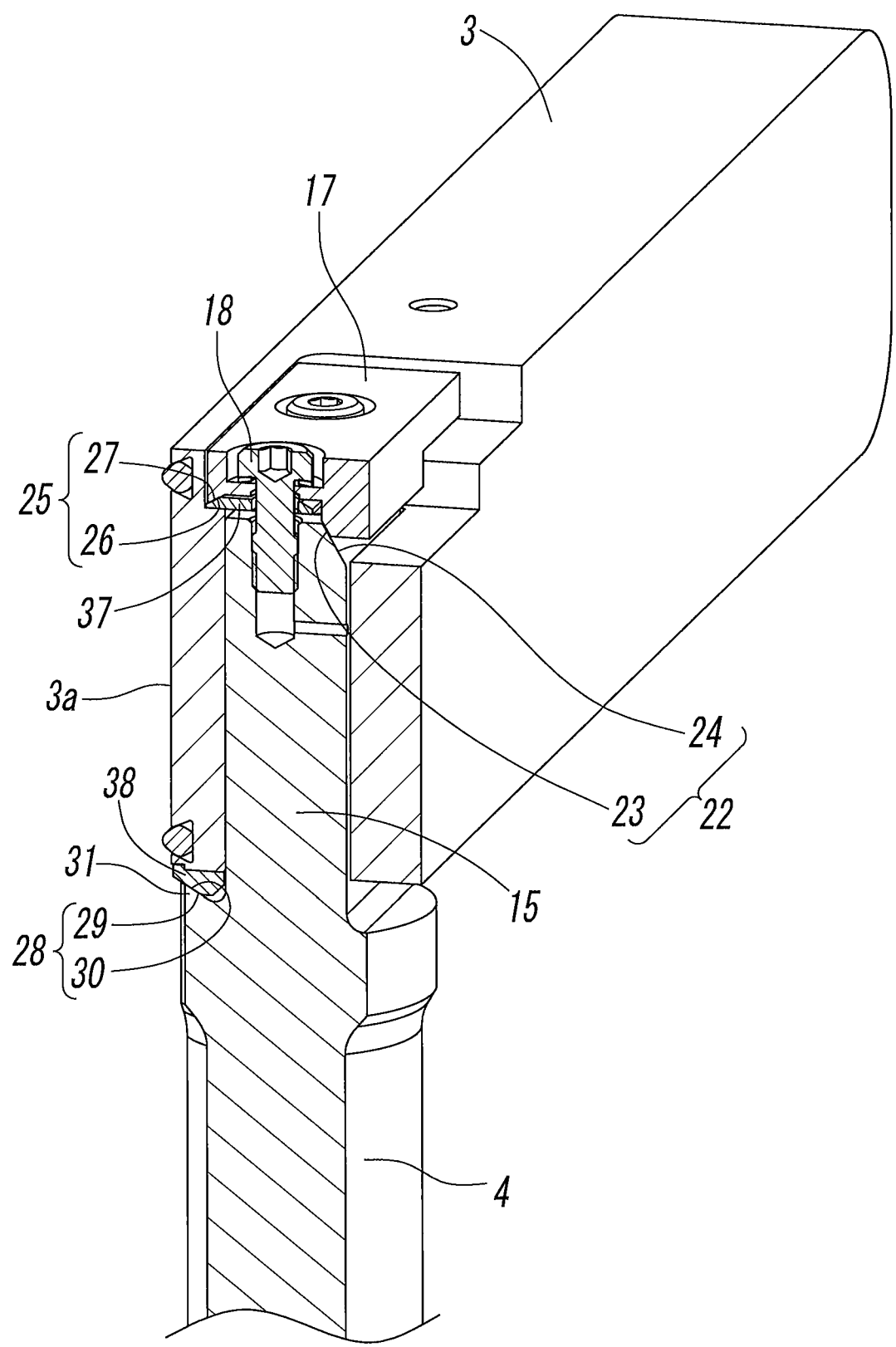
FIG. 8 is a sectional view taken along line VIII-VIII in FIG. 4.
Figure 9:
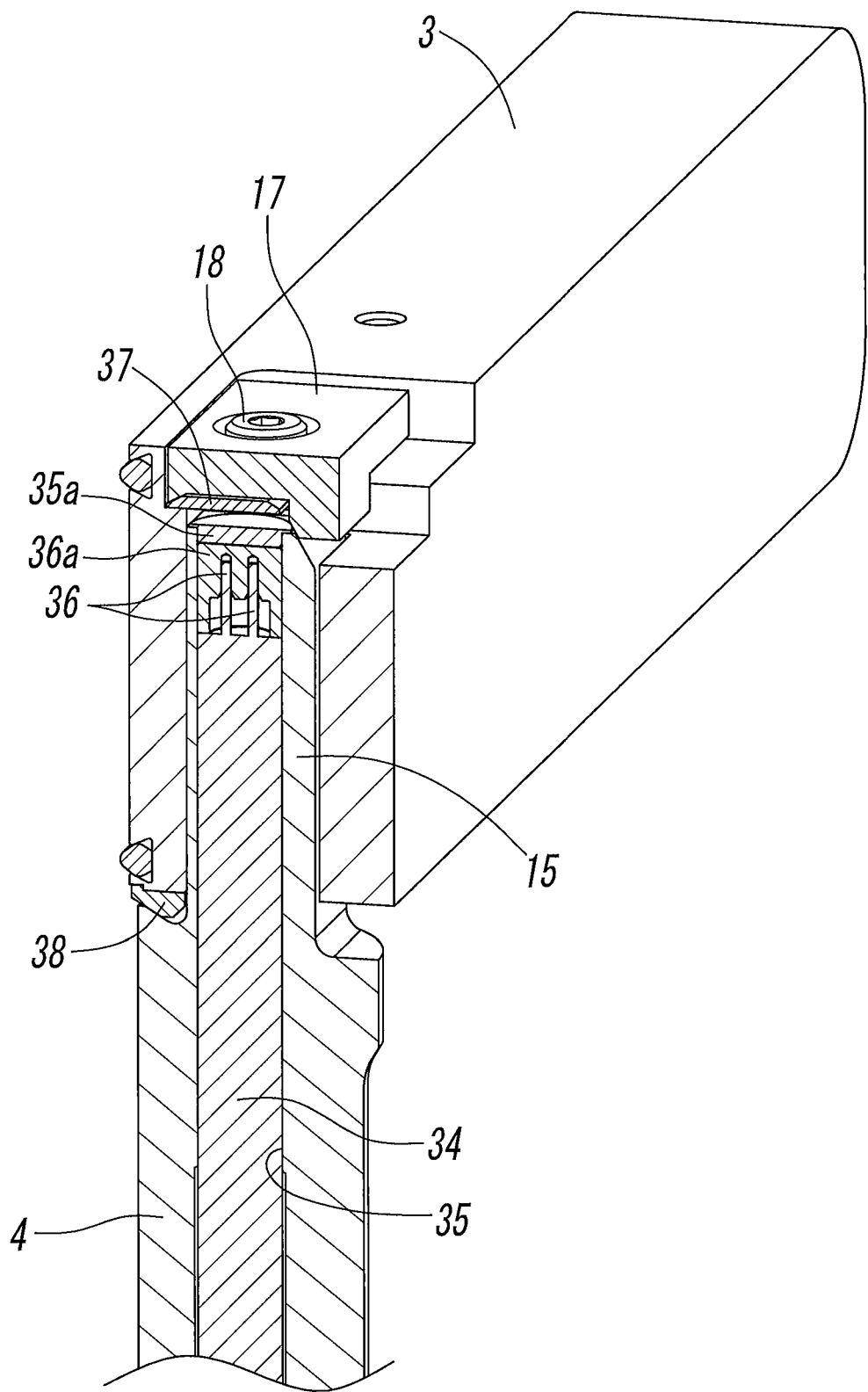
FIG. 9 is a sectional view taken along line IX-IX in FIG. 4.

Next, the first connecting structure for connecting the valve plate 3 and the valve rod 4 will be described with reference to FIGS. 4 to 18. As shown in FIG. 9, the first connecting structure is a connecting structure in the case where a heater 34 is accommodated in the valve rod 4, and the degree of close contact between the valve plate 3 and the valve rod 4 is increased on the basis of the same principle as the principle of the basic structure shown in FIG. 3.

The heater 34 is a cartridge heater accommodated in a heater hole 35 penetrating through the center of the valve rod 4, and the upper end of the heater 34 extends to the inside of the connecting shaft 15. Furthermore, a thermocouple, serving as a sensor 36, is disposed at the upper end of the heater 34, and a temperature detecting part at an end of the thermocouple detects temperature.

The sensor 36 is accommodated in an aluminum sensor cover 36a having high heat transfer property, and the upper end of the heater hole 35 is covered by a stainless steel lid body 35a having high rigidity. The lid body 35a is welded to the attaching shaft 15, which is made of stainless steel. However, the sensor cover 36a and the lid body 35a may be formed of stainless steel as a single component and may be welded to the attaching shaft 15.

The major differences between the first connecting structure and the basic structure are: a point that the fourth inclined surface 27 of the second close-contact mechanism portion 25 and the fifth inclined surface 29 of the third close-contact mechanism portion 28 are not directly formed on the valve plate 3 but are formed on a first auxiliary fitting 37 and a second auxiliary fitting 38 securely attached to the valve plate 3; and a point related to the configuration for providing the first auxiliary fitting 37 and the second auxiliary fitting 38. The other configuration and operation are mostly the same as those of the basic structure.

Accordingly, in the description below, portions of the first connecting structure having the same configuration and function as those in the basic structure may be denoted by the same reference signs as those used in the basic structure, and portions having the same configuration as those of in the basic structure will be denoted by the same reference signs as those used in the basic structure, and the descriptions thereof may be omitted.

As shown in FIGS. 4 to 9, the recess 16 formed in the valve upper face 3c of the valve plate 3 is open to the outside on the valve back face 3b side of the valve plate 3 and is closed on the valve front face 3a side of the valve plate 3. The recess 16 includes a first recess 16a extending in the front-rear and left-right directions so as to straddle the connection hole 14, and a second recess 16b formed between the connection hole 14 and the valve back face 3b. The length of the second recess 16b in the left-right direction is substantially the same as the length of the connection hole 14 in the left-right direction, and the depth of the second recess 16b from the valve upper face 3c is larger than the depth of the first recess 16a from the valve upper face 3c. Furthermore, in the first recess 16a, fitting engaging holes 39, 39 having a rectangular shape in plan view are formed to the left and right sides of the connection hole 14, one on each side, at positions close to the valve front face 3a.

The connecting fitting 17 is accommodated in the recess 16 with the first auxiliary fitting 37 interposed therebetween. The two connecting screws 18, 18 are screwed into the two screw holes 20, 20 formed in the upper face of the connecting shaft 15 of the valve rod 4 through the two screw insertion holes 19, 19 formed in the connecting fitting 17 and two screw insertion holes 40, 40 formed in the first auxiliary fitting 37. As a result, the first auxiliary fitting 37 is disposed in a state in which it is substantially fixed to the valve plate 3, and the connecting fitting 17 is attached to the upper end of the connecting shaft 15 from above the first auxiliary fitting 37 in a state of being partially in contact with the connecting shaft 15 and the first auxiliary fitting 37.

Figure 10:
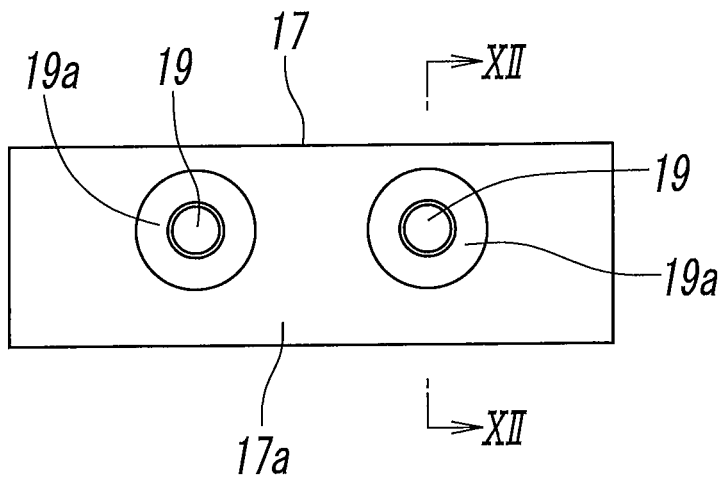
FIG. 10 is a plan view of a connecting fitting.
Figure 11:
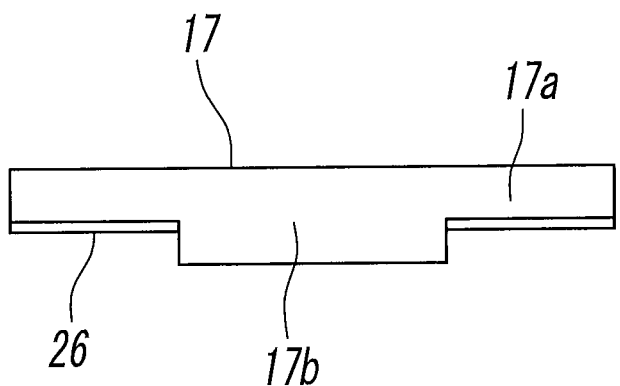
FIG. 11 is a back view of the connecting fitting.
Figure 12:
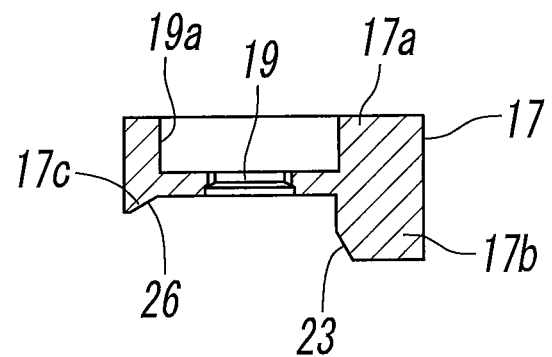
FIG. 12 is a sectional view taken along line XII-XII in FIG. 10.

As shown in FIGS. 10 to 12, the connecting fitting 17 includes a plate-shaped body 17a having a rectangular shape in plan view, a rear wall portion 17b extending downward from the central part of the rear end of the body 17a, and a front wall portion 17c extending downward from the central part of the front face of the body 17a. The first inclined surface 23 of the first close-contact mechanism portion 22 is formed at the lower end of the front face of the rear wall portion 17b, and the third inclined surface 26 of the second close-contact mechanism portion 25 is formed at the back face of the front wall portion 17c. As shown in FIG. 8, the first inclined surface 23 is in contact with the second inclined surface 24 formed at the upper end of the shaft back face 15b of the connecting shaft 15, and the third inclined surface 26 is in contact with the fourth inclined surface 27 formed on the first auxiliary fitting 37.

Figure 13:
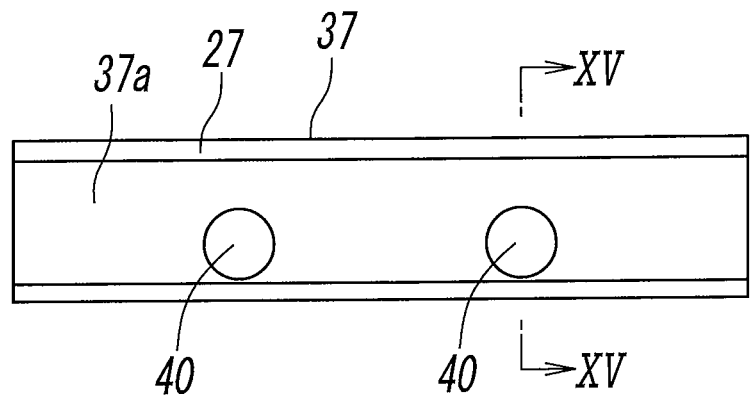
FIG. 13 is a plan view of a first auxiliary fitting.
Figure 14:
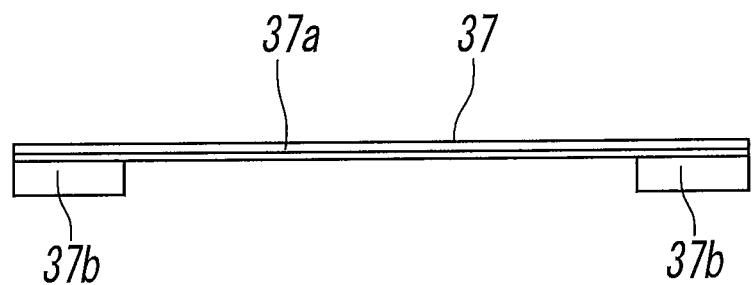
FIG. 14 is a back view of the first auxiliary fitting.
Figure 15:
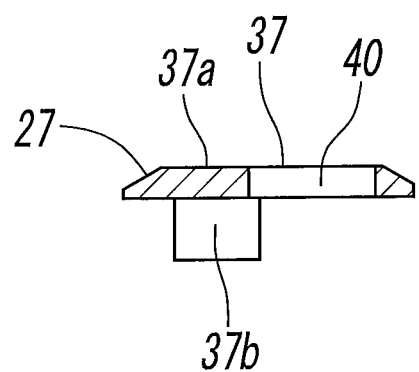
FIG. 15 is a sectional view taken along line XV-XV in FIG. 13.

On the other hand, the first auxiliary fitting 37 is a fitting in which the fourth inclined surface 27 of the second close-contact mechanism portion 25 is formed. As shown in FIGS. 13 to 15, the first auxiliary fitting 37 includes a plate-shaped body 37a having a rectangular shape in plan view, and two engaging projections 37b, 37b formed on the lower face of the body 37a, at positions near the left and right ends. By fitting and engaging the engaging projections 37b, 37b into and with the fitting engaging holes 39, 39 in the valve plate 3, the first auxiliary fitting 37 is disposed in a state in which it is substantially fixed to the valve plate 3.

However, because the screw insertion holes 40 formed in the first auxiliary fitting 37 have the same diameter as or a slightly larger diameter than the screw insertion holes 19 formed in the connecting fitting 17, the first auxiliary fitting 37 can be slightly and relatively displaced with respect to the connecting fitting 17 in the front-rear direction of the valve plate 3 when the connecting screws 18 are fastened.

The length of the first auxiliary fitting 37 in the left-right direction is slightly smaller than the length of the first recess 16a in the left-right direction, and the length of the first auxiliary fitting 37 in the front-rear direction is such a length that the rear end of the first auxiliary fitting 37 extends toward the shaft back face 15b beyond the screw holes 20. An inclined surface is formed on each of the front face and the back face of the body 37a, and among them, the inclined surface formed on the front face is the fourth inclined surface 27.

Herein, because the first auxiliary fitting 37 constitutes a part of the valve plate 3 by being securely disposed on the valve plate 3, it can be said that the fourth inclined surface 27 is formed on a part of the valve plate 3. Hence, in the present invention, both in the case where the fourth inclined surface 27 is directly formed on the valve plate 3 and the case where the fourth inclined surface 27 is indirectly formed on the valve plate 3 through the first auxiliary fitting 37, the fourth inclined surface 27 is assumed to be formed on the valve plate 3. This assumption applies to the other inclined surfaces, and in particular, it applies to the fifth inclined surface 29 (described below) and the second inclined surface 24 in FIG. 25.

The second auxiliary fitting 38 is fixed to the center of the lower end of the valve front face 3a of the valve plate 3 with multiple fitting fixing screws 41. The fifth inclined surface 29 of the third close-contact mechanism portion 28 is formed on the second auxiliary fitting 38, and the fifth inclined surface 29 is in contact with the sixth inclined surface 30 of the connecting shaft 15.

Figure 16:
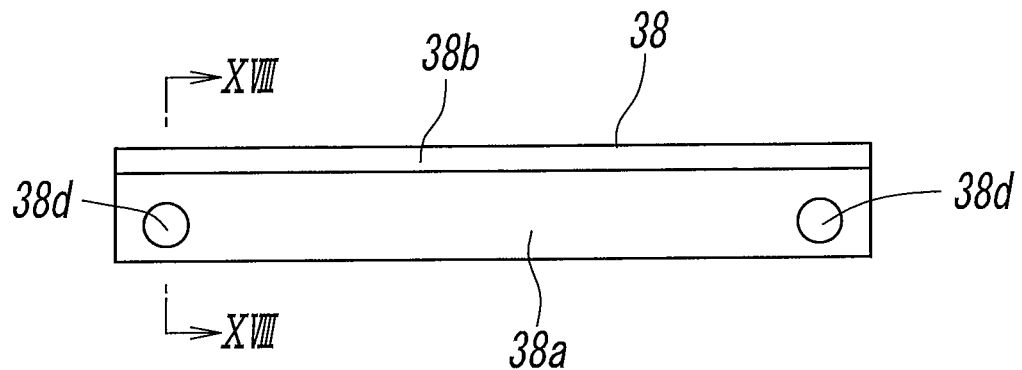
FIG. 16 is a plan view of a second auxiliary fitting.
Figure 17:
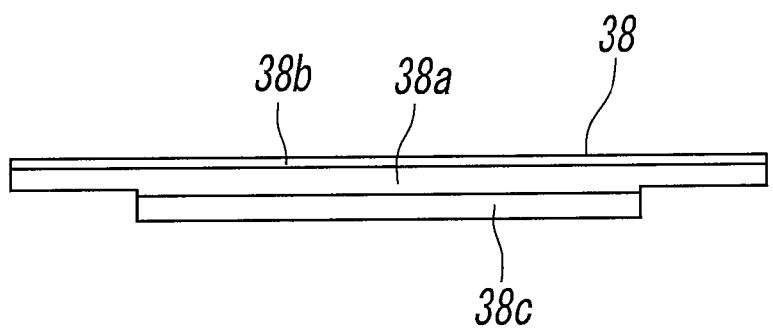
FIG. 17 is a back view of the second auxiliary fitting.
Figure 18:
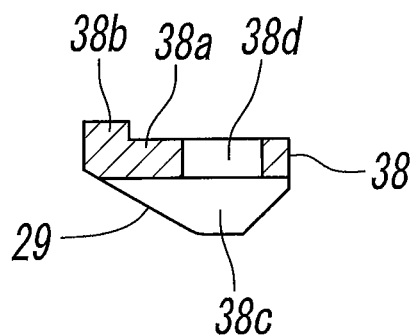
FIG. 18 is a sectional view taken along line XVIII-XVIII in FIG. 16.

As shown in FIGS. 16 to 18, the second auxiliary fitting 38 includes a body 38a having a rectangular shape in plan view, an engaging wall 38b projecting upward from the front end of the body 38a, and an abutting wall 38c projecting downward from the body 38a. Screw insertion holes 38d, through which the fitting fixing screws 41 are to be inserted, are formed at the left and right ends of the body 38a.

The engaging wall 38b is formed over the overall length of the body 38a and is engaged with the lower end of the valve plate 3. The abutting wall 38c is formed partially at the central part of the body 38a in the length direction (left-right direction), and the length of the abutting wall 38c in the left-right direction is slightly larger than the length of the projecting wall portion 31 on the valve rod 4 in the left-right direction. The fifth inclined surface 29 is formed in the abutting wall 38c.

Because the first connecting structure is configured in this manner, as in the case of the basic structure, due to the cooperative action of the first close-contact mechanism portion 22, the second close-contact mechanism portion 25, and the third close-contact mechanism portion 28 when the connecting screws 18 are fastened, the valve plate 3 and the valve rod 4 are connected in a state in which the facing portions of the hole front face 14a of the connection hole 14 and the shaft front face 15a of the connecting shaft 15 are in close contact with each other over the entire surfaces. As a result, the heat from the heater 34 is efficiently transferred from the valve rod 4 to the valve plate 3.

Figure 19:
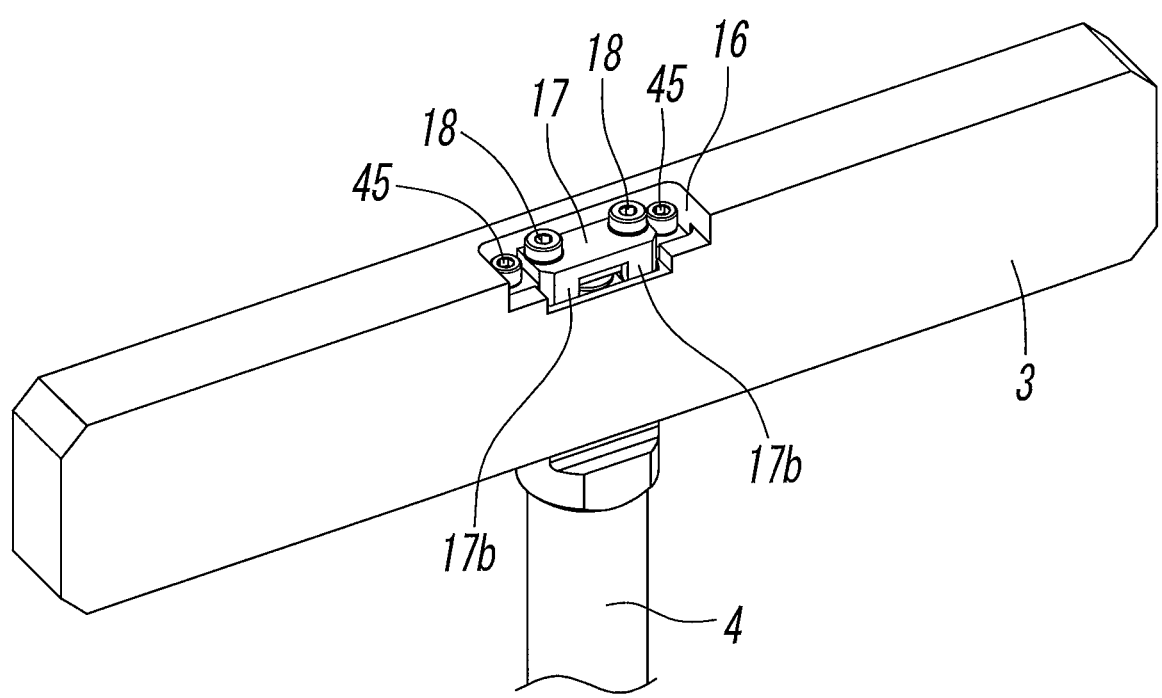
FIG. 19 is a perspective view of a second connecting structure for connecting the valve plate and the valve rod.
Figure 20:
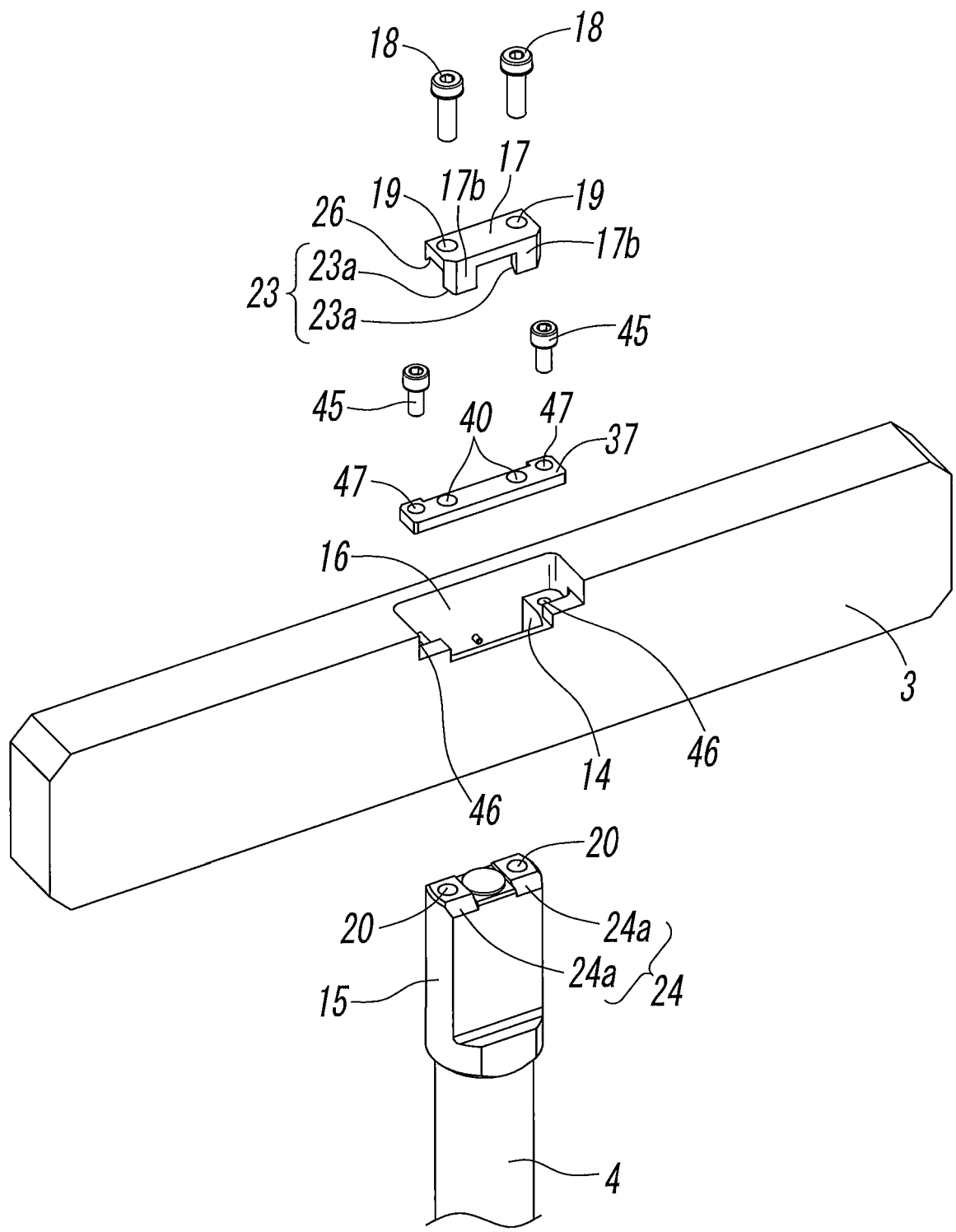
FIG. 20 is an exploded view of FIG. 19.

FIGS. 19 and 20 show a second connecting structure for connecting the valve plate 3 and the valve rod 4. The major differences between the second connecting structure and the first connecting structure are: a point that the first auxiliary fitting 37 is fixed to the valve plate 3 with two fitting fixing screws 45, 45; a point that the second inclined surface 24 at the upper end of the connecting shaft 15 is divided into two (left and right) surface portions 24a, 24a; and a point that the first inclined surface 23 of the connecting fitting 17 is also divided into two (left and right) surface portions 23a, 23a. The other configuration and operation are substantially same as those of the first connecting structure.

Thus, main portions where the second connecting structure differ from the first connecting structure will be described below.

As shown in FIGS. 19 and 20, the valve plate 3 has fitting screw holes 46, 46 to the left and right sides of the connection hole 14 in the recess 16. The first auxiliary fitting 37 has screw insertion holes 47, 47 at positions near the left and right ends. By screwing the fitting fixing screws 45, 45 inserted through the screw insertion holes 47, 47 into the fitting screw holes 46, 46, the first auxiliary fitting 37 is fixed to the valve plate 3.

Furthermore, the connecting fitting 17 has substantially the same length in the left-right direction as the length of the connecting shaft 15 in the left-right direction and has, at the rear end thereof, two (left and right) rear wall portions 17b, 17b. The two surface portions 23a, 23a, which constitute the first inclined surface 23, are formed at the lower end of the front face of the rear wall portions 17b, 17b. The connecting fitting 17 is fixed to the connecting shaft 15 via the first auxiliary fitting 37 by screwing the connecting screws 18, 18 into the screw holes 20, 20 at the upper end of the connecting shaft 15 of the valve rod 4 through the screw insertion holes 19, 19 and the screw insertion holes 40, 40 in the first auxiliary fitting 37. The two surface portions 23a, 23a constituting the first inclined surface 23 of the connecting fitting 17 are in contact with the two surface portions 24a, 24a constituting the second inclined surface 24 of the connecting shaft 15.

Figure 21:
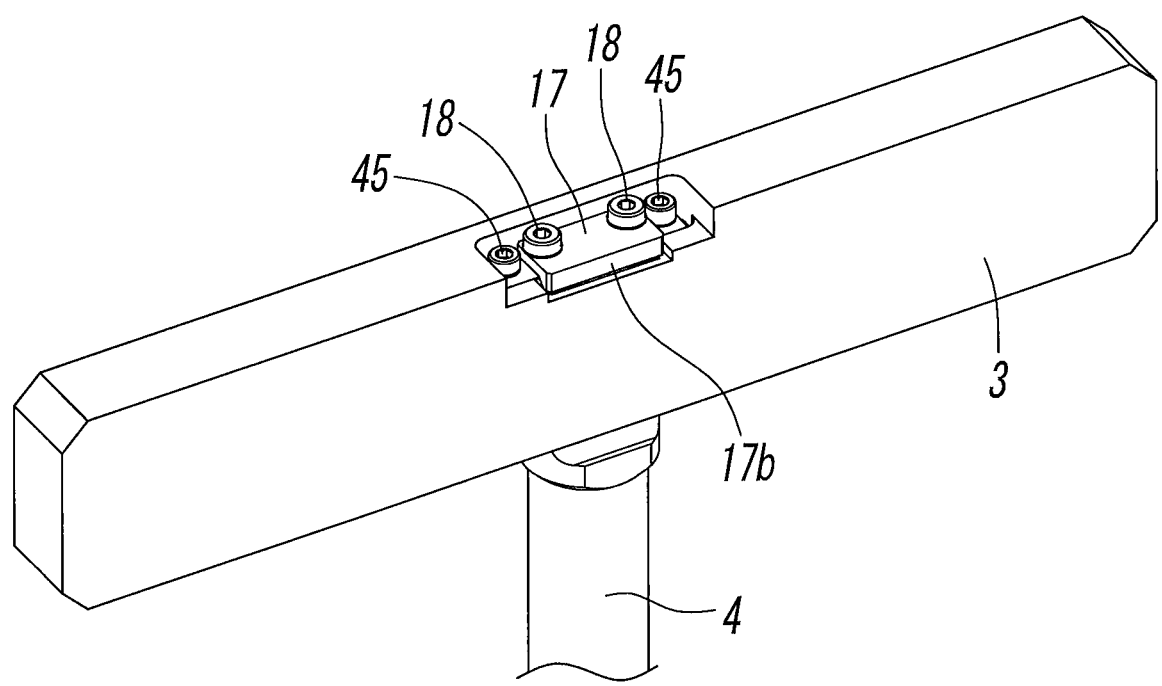
FIG. 21 is a perspective view of a third connecting structure for connecting the valve plate and the valve rod.
Figure 22:
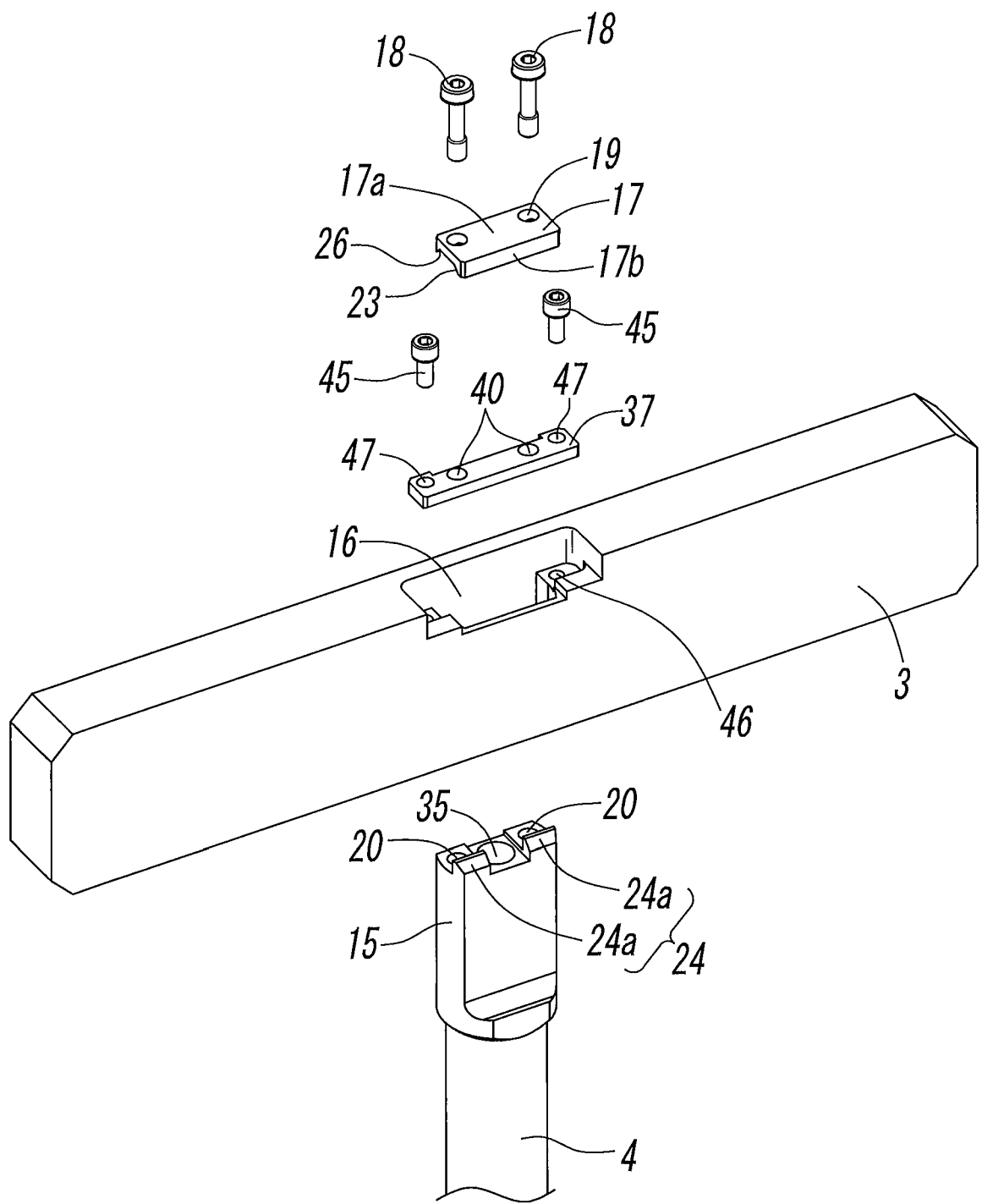
FIG. 22 is an exploded view of FIG. 21.

FIGS. 21 and 22 show a third connecting structure for connecting the valve plate 3 and the valve rod 4. The major differences between the third connecting structure and the second connecting structure are: a point that the two surface portions 24a, 24a constituting the second inclined surface 24 at the upper end of the connecting shaft 15 of the valve rod 4 project upward from the portion where the screw holes 20, 20 and the heater hole 35 are formed; and a point that the rear wall portion 17b of the connecting fitting 17 is formed as a single continuous component extending over the entirety of the body 17a in the left-right direction (length direction), and the height thereof is lower than the height of the rear wall portion 17b of the connecting fitting 17 in the second connecting structure.

The other configuration and operation of the third connecting structure are substantially the same as those of the second connecting structure.

Figure 23:
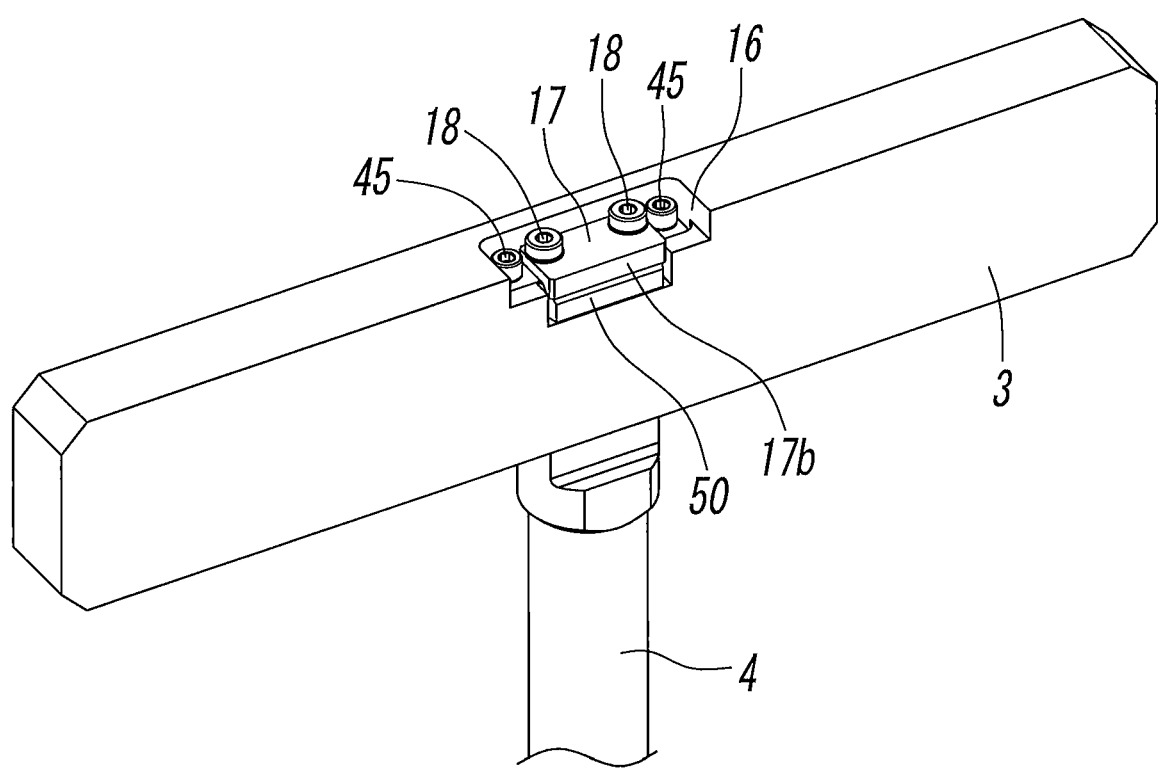
FIG. 23 is a perspective view of a fourth connecting structure for connecting the valve plate and the valve rod.
Figure 24:
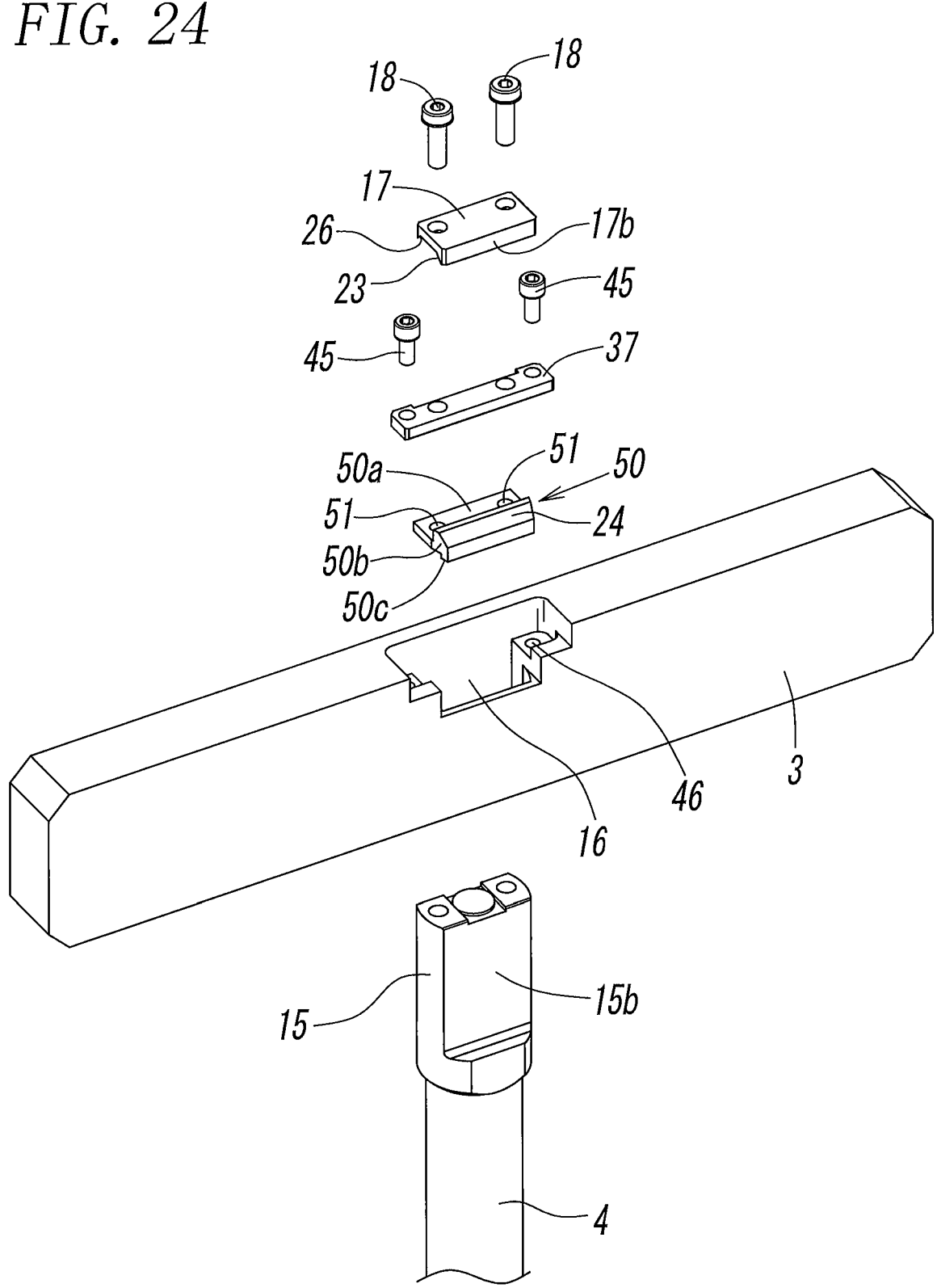
FIG. 24 is an exploded view of FIG. 23.
Figure 25:
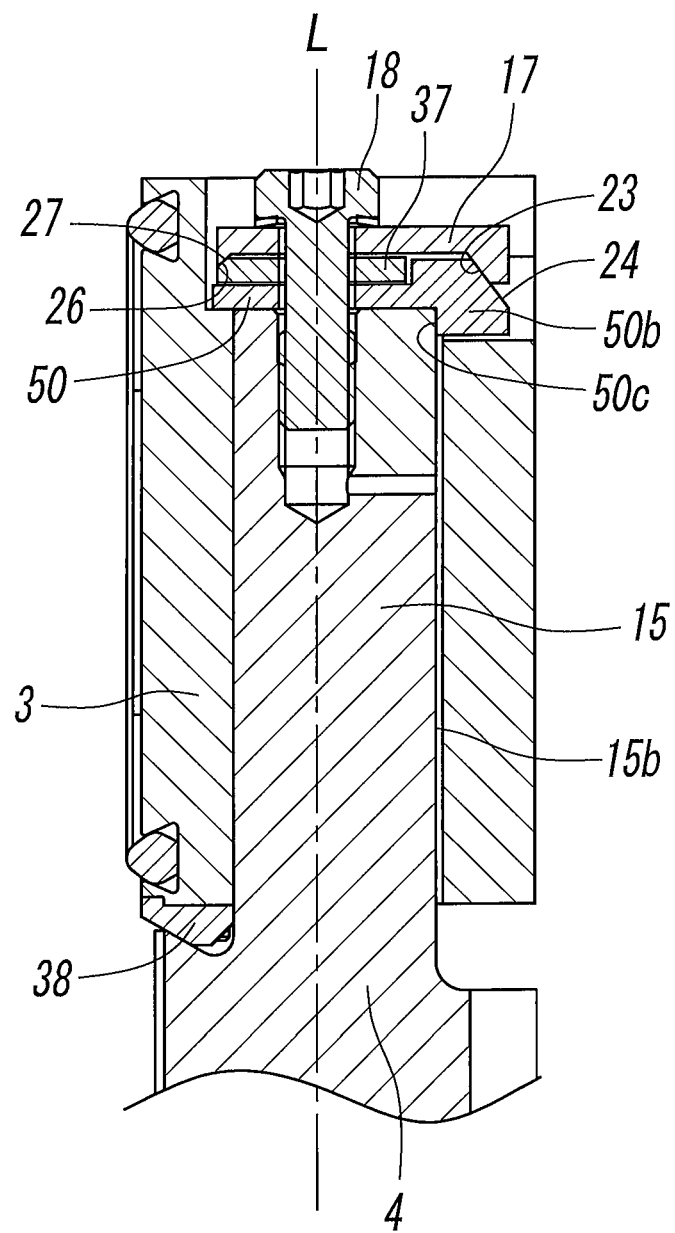
FIG. 25 is a sectional view of FIG. 23.

FIGS. 23, 24, and 25 show a fourth connecting structure for connecting the valve plate 3 and the valve rod 4. The major difference between the fourth connecting structure and the third connecting structure is a point that the second inclined surface 24 at the upper end of the connecting shaft 15 of the valve rod 4 is formed as one surface on a shaft auxiliary fitting 50 that is fixed to the upper end of the connecting shaft 15. The other configuration and operation are substantially the same as those of the third connecting structure.

The shaft auxiliary fitting 50 includes a plate-shaped body 50a having a rectangular shape in plan view, and an abutting wall 50b standing upright from the rear end of the body 50a. The body 50a is provided with two screw insertion holes 51, 51 into which the two connecting screws 18, 18 are to be inserted, and an engaging edge 50c to be engaged with the upper end of the shaft back face 15b of the connecting shaft 15 is formed on the lower face of the abutting wall 50b, and the second inclined surface 24 is formed on the upper end of the abutting wall 50b.

The shaft auxiliary fitting 50 is disposed below the first auxiliary fitting 37 and is fixed to the upper end of the connecting shaft 15 with the connecting screws 18, 18. The first inclined surface 23 of the connecting fitting 17 is in contact with the second inclined surface 24.

Note that, although the heater is not accommodated in the valve rod 4 in the basic structure shown in FIG. 3, the heater may be accommodated in the valve rod 4, as in the first to fourth connecting structures.

Likewise, the first connecting structure, the second connecting structure, the third connecting structure, and the fourth connecting structure may be used when the heater is not accommodated in the valve rod 4, as in the basic structure.

REFERENCE SIGNS LIST 1 valve body
2 opening
3 valve plate
3a valve front face
3b valve back face
3c valve upper face
3d valve lower face
14 connection hole
14a hole front face
14b hole back face
15 connecting shaft
15a shaft front face
15b shaft back face
16 recess
17 connecting fitting
18 connecting screw
19 screw insertion hole
20 screw hole
22 first close-contact mechanism portion
23 first inclined surface
24 second inclined surface
25 second close-contact mechanism portion
26 third inclined surface
27 fourth inclined surface
28 third close-contact mechanism portion
29 fifth inclined surface
30 sixth inclined surface
34 heater
35 heater hole
37 first auxiliary fitting
38 second auxiliary fitting
50 shaft auxiliary fitting
L center axis
α, β inclination angle

The invention claimed is:

1. A gate valve comprising:
a valve plate for opening and closing an opening in a valve body; and
a valve rod connected to the valve plate, wherein
the valve plate includes a valve front face facing the opening, a valve back face on the opposite side to the valve front face, a valve upper face, a valve lower face, and a connection hole vertically penetrating through the valve plate, and the valve rod includes a connecting shaft inserted through the connection hole,
the connection hole includes a hole front face and a hole back face, the connecting shaft includes a shaft front face and a shaft back face, the hole front face and the shaft front face face each other, and the hole back face and the shaft back face face each other,
a connecting fitting for connecting the valve plate and the valve rod is provided on the upper face of the valve plate, and the connecting fitting is disposed so as to be in contact with a part of the connecting shaft and a part of the valve plate by screwing a connecting screw into a screw hole at an end of the connecting shaft through a screw insertion hole in the connecting fitting,
a first close-contact mechanism portion where a first inclined surface of the connecting fitting and a second inclined surface of the connecting shaft are in contact with each other is formed at a portion where the connecting fitting is in contact with the connecting shaft, and a second close-contact mechanism portion where a third inclined surface of the connecting fitting and a fourth inclined surface of the valve plate are in contact with each other is formed at a portion where the connecting fitting is in contact with the valve plate,
when the first inclined surface is pressed against the second inclined surface, and the third inclined surface is pressed against the fourth inclined surface by fastening the connecting screw, the first close-contact mechanism portion and the second close-contact mechanism portion generate, at the upper end of the connecting shaft and the upper end of the valve plate, components of force in directions in which the shaft front face of the connecting shaft and the hole front face of the connection hole are brought into close contact with each other,
a third close-contact mechanism portion where a fifth inclined surface of the valve plate and a sixth inclined surface of the connecting shaft are in contact with each other is formed at a portion where the lower end of the valve plate is in contact with a projecting wall portion at the lower end of the shaft front face of the connecting shaft, and when the fifth inclined surface is pressed against the sixth inclined surface by fastening the connecting screw, the third close-contact mechanism portion generates, at the lower end of the valve plate, a component of force in a direction in which the hole front face of the valve hole is brought into close contact with the shaft front face of the connecting shaft.

2. The gate valve according to claim 1, wherein the first close-contact mechanism portion and the second close-contact mechanism portion are located at positions on the opposite sides to each other with respect to a center axis passing through the center of the screw hole, and the inclination direction of the first inclined surface and the second inclined surface and the inclination direction of the third inclined surface and the fourth inclined surface are opposite to each other and become closer to the center axis at upper portions thereof.

3. The gate valve according to claim 1, wherein the connecting fitting is not in contact with the valve plate or the valve rod at portions other than the first close-contact mechanism portion and the second close-contact mechanism portion.

4. The gate valve according to claim 1, wherein the connecting fitting is accommodated in a recess formed in the upper face of the valve plate so as not to project upward from the upper face of the valve plate.

5. The gate valve according to claim 1, wherein the fourth inclined surface and the fifth inclined surface are formed on a first auxiliary fitting and a second auxiliary fitting that are securely attached to the valve plate.

6. The gate valve according to claim 1, wherein the second inclined surface is formed on a shaft auxiliary fitting that is fixed to the connecting shaft of the valve rod.

7. The gate valve according to claim 1, wherein a heater hole is formed inside the valve rod so as to extend to the inside of the connecting shaft, and a heater is accommodated in the heater hole.

* * * * *